US011783608B2

(12) United States Patent
Sugihara (10) Patent No.: US 11,783,608 B2
(45) Date of Patent: Oct. 10, 2023

(54) IMAGE PROCESSING APPARATUS AND IMAGE PROCESSING METHOD

(71) Applicant: KYOCERA Document Solutions Inc., Osaka (JP)

(72) Inventor: Hiroshi Sugihara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 172 days.

(21) Appl. No.: 17/352,588

(22) Filed: Jun. 21, 2021

(65) Prior Publication Data

US 2022/0005242 A1    Jan. 6, 2022

(30) Foreign Application Priority Data

Jul. 2, 2020 (JP) ................. 2020-114723

(51) Int. Cl.
| | |
|---|---|
| *G06T 11/60* | (2006.01) |
| *G06V 30/148* | (2022.01) |
| *G06T 7/73* | (2017.01) |
| *H04N 1/387* | (2006.01) |
| *G06V 30/19* | (2022.01) |
| *G06V 10/82* | (2022.01) |

(52) U.S. Cl.
CPC ............ *G06V 30/155* (2022.01); *G06T 7/73* (2017.01); *G06T 11/60* (2013.01); *G06V 10/82* (2022.01); *G06V 30/19093* (2022.01); *H04N 1/3876* (2013.01); *G06T 2207/20084* (2013.01); *G06T 2207/20221* (2013.01); *G06T 2207/30176* (2013.01)

(58) Field of Classification Search
CPC ............... G06V 30/155; G06V 10/82; G06V 30/19093; G06T 7/73; G06T 11/60; G06T 2207/20084; G06T 2207/20221; G06T 2207/30176; H04N 1/3876; H04N 1/3871
See application file for complete search history.

(56) References Cited

U.S. PATENT DOCUMENTS

| | | | | |
|---|---|---|---|---|
| 2011/0199627 A1* | 8/2011 | Tzadok | ................... | G06T 11/60 358/1.11 |
| 2013/0155471 A1* | 6/2013 | Jones | ..................... | G06V 30/40 358/450 |
| 2021/0064860 A1* | 3/2021 | Tuma | ...................... | G06F 16/93 |
| 2021/0357674 A1* | 11/2021 | Ogawa | .................. | G06V 20/62 |

FOREIGN PATENT DOCUMENTS

JP       2009070088 A      4/2009

* cited by examiner

*Primary Examiner* — John Villecco
*Assistant Examiner* — Han Hoang
(74) *Attorney, Agent, or Firm* — Alleman Hall Creasman & Tuttle LLP (57) ABSTRACT

An image processing apparatus includes an extraction portion and a fusion portion. The extraction portion extracts a first object from each of a plurality of pieces of image data that include the first object and a second object, the first object including a handwritten object, the second object including a non-handwritten object. The fusion portion generates a fusion image by fusing a plurality of first objects extracted from the plurality of pieces of image data into the second object that is common to the plurality of pieces of image data.

5 Claims, 6 Drawing Sheets

IMAGE PROCESSING APPARATUS AND IMAGE PROCESSING METHOD

INCORPORATION BY REFERENCE

This application is based upon and claims the benefit of priority from the corresponding Japanese Patent Application No. 2020-114723 filed on Jul. 2, 2020, the entire contents of which are incorporated herein by reference.

BACKGROUND

The present disclosure relates to an image processing apparatus and an image processing method.

There is known, as a related technology, an information processing apparatus that is configured to detect, based on an image of a form read by a scanner, a place where description on the form has been corrected by handwriting. In the information processing apparatus according to the related technology, a cancellation place detection portion detects a place on the form where there is written a straight line in a certain direction with a length which is equal to or larger than a predetermined value, or a place where there is a description disturbing certain regularity. A correction region determining portion determines, among a plurality of regions on the form that have been specified in advance, a region including a place detected by the cancellation place detection portion, as a region where a handwritten correction was made. An information generating portion generates a form image in which the region determined as the correction region by the correction region determining portion is highlighted on display.

SUMMARY

An image processing apparatus according to an aspect of the present disclosure includes an extraction portion and a fusion portion. The extraction portion extracts a first object from each of a plurality of pieces of image data that include the first object and a second object, the first object including a handwritten object, the second object including a non-handwritten object. The fusion portion generates a fusion image by fusing a plurality of first objects extracted from the plurality of pieces of image data into the second object that is common to the plurality of pieces of image data.

An image processing method according to another aspect of the present disclosure includes an extraction process and a fusion process. The extraction process extracts a first object from each of a plurality of pieces of image data that include the first object and a second object, the first object including a handwritten object, the second object including a non-handwritten object. The fusion process generates a fusion image by fusing a plurality of first objects extracted from the plurality of pieces of image data into the second object that is common to the plurality of pieces of image data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[1] Entire Configuration of Image Processing Apparatus

First, an entire configuration of an image processing apparatus 10 according to the present embodiment is described with reference to FIG. 1.

The image processing apparatus 10 according to the present embodiment is, for example, a multifunction peripheral having a plurality of functions such as a scan function for reading image data from a document sheet, a print function for forming an image based on image data, a facsimile function, and a copy function. The image processing apparatus 10 only needs to have an image processing function, wherein the image processing function includes at least one of a function to form an image and a function to read image data, and the image processing apparatus 10 may be a printer, a scanner, a facsimile apparatus, or a copier.

Figure 1:
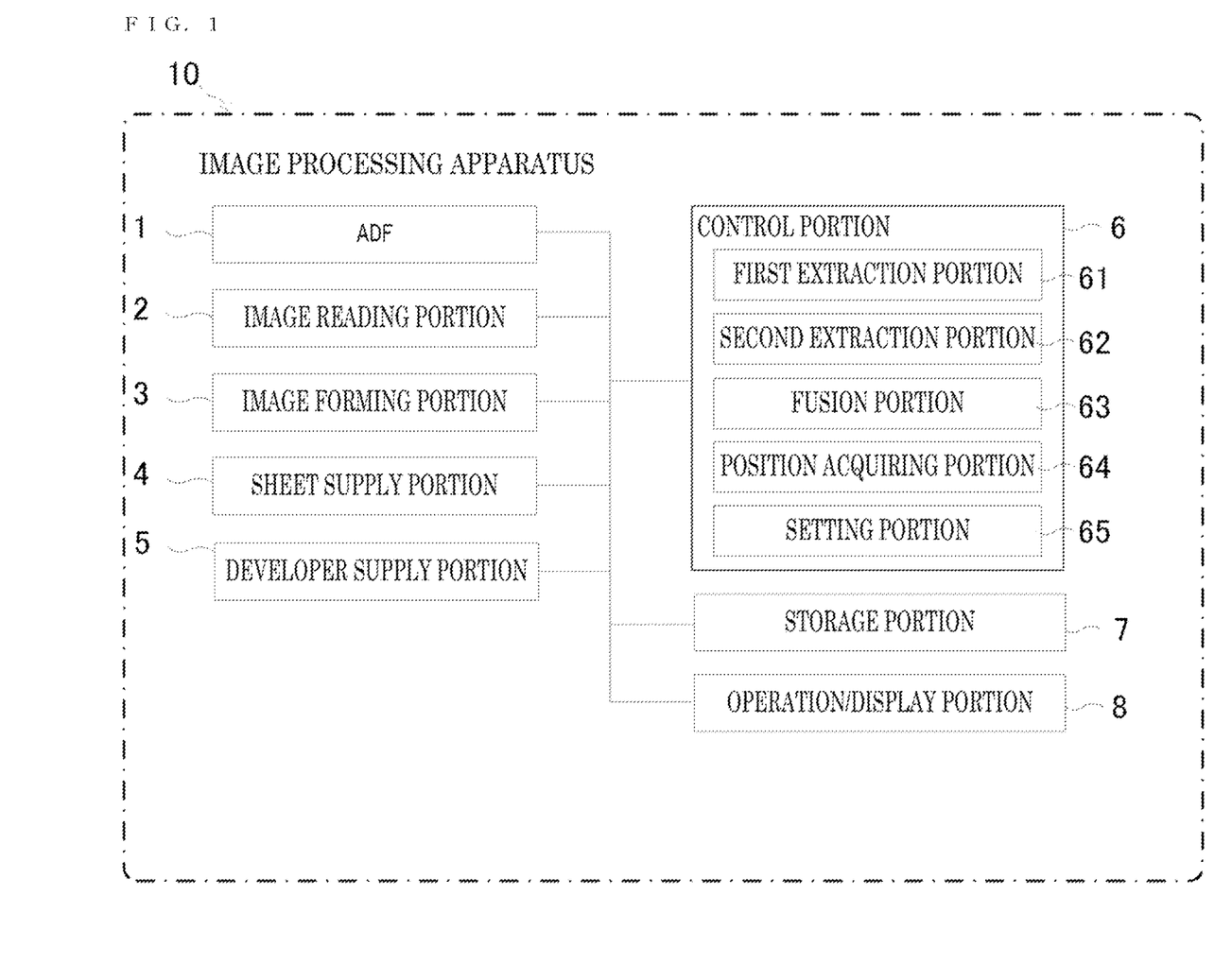
FIG. 1 is a block diagram showing a configuration of an image processing apparatus according to an embodiment.

As shown in FIG. 1, the image processing apparatus 10 includes an automatic document sheet conveying device 1, an image reading portion 2, an image forming portion 3, a sheet supply portion 4, a developer supply portion 5, a control portion 6, a storage portion 7, and an operation/display portion 8. The automatic document sheet conveying device 1 is an ADF (Auto Document Feeder). As a result, the automatic document sheet conveying device 1 is denoted as "ADF" in FIG. 1, and is referred to as "ADF 1" in the following description.

The ADF 1 conveys a document sheet so that it is read by the image reading portion 2. The ADF 1 includes a document sheet setting portion, a plurality of conveyance rollers, a document sheet pressing, and a sheet discharge portion.

The image reading portion 2 is configured to read an image from a document sheet and output image data corresponding to the read image. The image reading portion 2 includes a document sheet table, a light source, a plurality of mirrors, an optical lens, and a CCD (Charge Coupled Device).

The image forming portion 3 is configured to form an image on a sheet by an electrophotographic method based on image data output from the image reading portion 2. In addition, the image forming portion 3 is configured to form an image on a sheet based on image data input from an information processing apparatus external to the image processing apparatus 10. The image forming portion 3 includes four image forming units respectively corresponding to four colors of C (cyan), M (magenta), Y (yellow), and K (black), a laser scanning unit, an intermediate transfer belt, a secondary transfer roller, and a fixing device. It is noted that the image forming portion 3 may form an image on a sheet by an image forming method, such as an inkjet method, other than the electrophotographic method.

The sheet supply portion 4 supplies a sheet to the image forming portion 3. The image forming portion 3 forms an image on a sheet supplied from the sheet supply portion 4.

The developer supply portion 5 supplies toner as developer to the image forming portion 3. The image forming portion 3 forms an image on a sheet by using the toner supplied from the developer supply portion 5. In a case where the image forming portion 3 forms an image by an inkjet method, the developer supply portion 5 supplies ink (another example of the developer) to the image forming portion 3. The toner supplied by the developer supply portion 5 is, for example, toner of a plurality of colors such as C (cyan), M (magenta), Y (yellow), and K (black).

The control portion 6 comprehensively controls the image processing apparatus 10. The control portion 6 comprises, as a main configuration, a computer system which includes one or more processors and one or more memories. In the image processing apparatus 10, the functions of the control portion 6 are realized when the one or more processors execute programs. The programs may be previously recorded in the memories (the storage portion 7), may be provided via an electric communication line such as the Internet, or may be provided recorded in a non-transitory recording medium, such as a memory card or an optical disc, that can be read by the computer system. The one or more processors are composed of one or more electronic circuits including semiconductor integrated circuits. Furthermore, the computer system mentioned here includes a microcontroller that includes one or more processors and one or more memories. The control portion 6 may be a control portion provided independently of a main control portion that comprehensively controls the image processing apparatus 10.

The storage portion 7 includes one or more nonvolatile memories, and previously stores information such as control programs for causing the control portion 6 to execute various types of processes. Furthermore, the storage portion 7 is used as a temporary storage memory (a working area) for the various processes executed by the control portion 6.

The operation/display portion 8 is a user interface of the image processing apparatus 10. The operation/display portion 8 includes a display portion and an operation portion. The display portion is, for example, a liquid crystal display and displays various types of information in response to control instructions from the control portion 6. The operation portion is composed of, for example, switches or a touch panel through which various types of information are input to the control portion 6 in response to user operations. In addition, the image processing apparatus 10 may include an audio output portion and an audio input portion as a user interface, in addition to or instead of the operation/display portion 8.

Meanwhile, there is known, as a related technology, an information processing apparatus that is configured to detect, based on an image of a form read by a scanner, a place where description on the form has been corrected by handwriting. In the information processing apparatus according to the related technology, a cancellation place detection portion detects a place on the form where there is written a straight line in a certain direction with a length which is equal to or larger than a predetermined value, or a place where there is a description disturbing certain regularity. A correction region determining portion determines, among a plurality of regions on the form that have been specified in advance, a region including a place detected by the cancellation place detection portion, as a region where a handwritten correction was made. An information generating portion generates a form image in which the region determined as the correction region by the correction region determining portion is highlighted on display.

On the other hand, the related technology is merely configured to detect handwritten places in each piece of image data, and in a case where handwritten objects are included in a plurality of pieces of image data, it is difficult for the related technology to legibly sort the handwritten objects included in the plurality of pieces of image data.

In view of the above-described problem, the image processing apparatus 10 according to the present embodiment adopts the following configuration so that in a case where handwritten objects are included in a plurality of pieces of image data, the handwritten objects in the plurality of pieces of image data can be legibly sorted.

Figure 2:
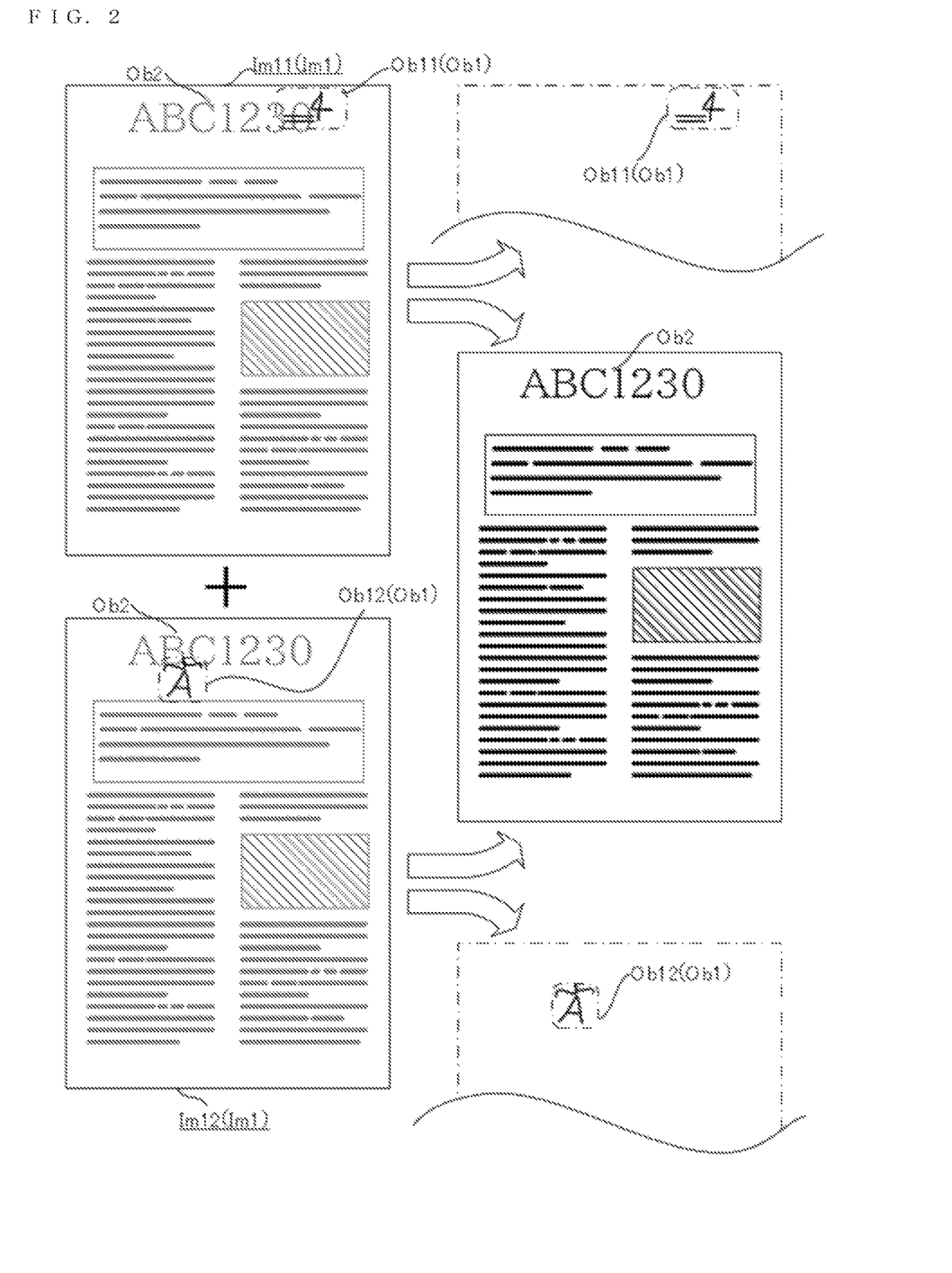
FIG. 2 is a schematic diagram showing how first objects and a second object are extracted by the image processing apparatus according to the embodiment.

That is, as shown in FIG. 1, the image processing apparatus 10 according to the present embodiment includes a first extraction portion (extraction portion) 61 and a fusion portion 63. As shown in FIG. 2, the first extraction portion 61 extracts first objects Ob1 from a plurality of pieces of image data Im1. The plurality of pieces of image data Im1 include the first objects Ob1 and second objects Ob2, wherein the first objects Ob1 include handwritten objects, and the second objects Ob2 include non-handwritten objects. The fusion portion 63 generates a fusion image Im10 by fusing a plurality of first objects Ob1 extracted from a plurality of pieces of image data Im1, into a second object Ob2 which is common to the plurality of pieces of image data Im1 that respectively include the extracted first objects Ob1. In the present embodiment, the first extraction portion 61 and the fusion portion 63 are provided in the control portion 6 as functions of the control portion 6.

Figure 4:
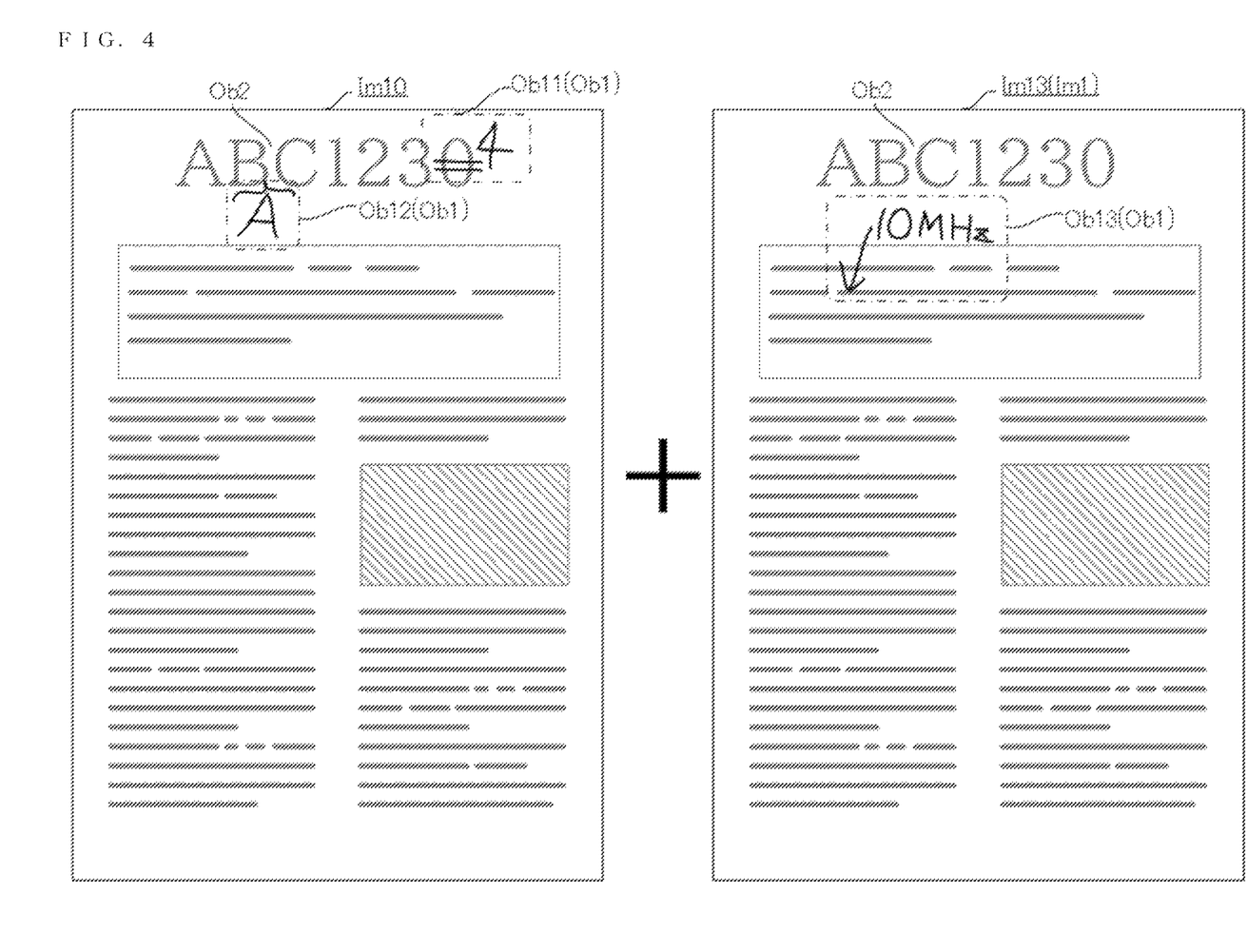
FIG. 4 is a schematic diagram showing an example of the fusion image generated by the image processing apparatus according to the embodiment.

In the following description, to distinguish a plurality of pieces of image data Im1 from each other, the plurality of pieces of image data Im1 are respectively referred to as image data Im11, image data Im12, and image data Im13 (see FIG. 2 and FIG. 4). Similarly, to distinguish a plurality of first objects Ob1 from each other, the plurality of first objects Ob1 are respectively referred to as a first object Ob11, a first object Ob12, and a first object Ob13 (see FIG. 2 and FIG. 4).

Each of the "plurality of pieces of image data Im1" in the present disclosure is either image data Im1 output from the image reading portion 2 or image data Im1 input from an information processing apparatus or the like external to the image processing apparatus 10. In the present embodiment, it is assumed, as one example, that each of the plurality of pieces of image data Im1 is image data Im1 output from the image reading portion 2. That is, in the image processing apparatus 10 according to the present embodiment, it is assumed that a plurality of pieces of image data Im1 that respectively correspond to a plurality of images read by the image reading portion 2 from a plurality of document sheets, are the "plurality of pieces of image data Im1" that are the target of extraction of the first objects Ob1.

According to the above-described configuration, the image processing apparatus 10 of the present embodiment is configured to extract a plurality of first objects Ob1 including handwritten objects from the plurality of pieces of image data Im1. Furthermore, the image processing apparatus 10 generates a fusion image Im10 by fusing a plurality of extracted first objects Ob1 into a second object Ob2 that is common to a plurality of pieces of image data Im1 that include the extracted first objects Ob1. That is, the fusion image Im10 is an image generated by fusing a plurality of first objects Ob1 including handwritten objects in the plurality of pieces of image data Im1, into a second object Ob2 which is common to a plurality of pieces of image data Im1 including the first objects Ob1, and the second object Ob2 includes a non-handwritten object in the plurality of pieces of image data Im1. Accordingly, the fusion image Im10 provides a view of a plurality of handwritten objects (first objects Ob1) included in a plurality of pieces of image data Im1 in association with a non-handwritten object (second object Ob2) which is common to the plurality of pieces of image data Im1. As a result, the image processing apparatus 10 according to the present embodiment has an advantageous effect that, in a case where handwritten objects are included in a plurality of pieces of image data Im1, the handwritten objects in the plurality of pieces of image data Im1 can be legibly sorted.

An example of use of the image processing apparatus 10 according to the present embodiment is a unified management of proofread document sheets. Here, the "proofread document sheet" refers to a document sheet in which a non-handwritten object is formed, and comments or the like of proofreading have been written by handwriting by a plurality of persons. The image reading portion 2 obtains a plurality of pieces of image data Im1 by reading images from a plurality of proofread document sheets. Each of the plurality of pieces of image data Im1 obtained in this way includes the second object Ob2 and the first object Ob1, wherein the second object Ob2 includes the original content of the document sheets and the first object Ob1 includes the content of the proofreading. Accordingly, when the image reading portion 2 reads a plurality of proofread document sheets proofread by a plurality of persons, the image reading portion 2 can obtain a plurality of pieces of image data Im1 that include individual first objects Ob1 and a second object Ob2 that is common to the plurality of pieces of image data Im1. In the image processing apparatus 10 according to the present embodiment, the fusion image Im10 is generated with respect to the plurality of pieces of image data Im1. This makes it possible to obtain one fusion image Im10 in which the content of proofreading by a plurality of persons is fused into the original content of the document sheet. As a result, the fusion image Im10 provides a view of an image that includes the results of proofreading performed by a plurality of persons. This helps sort the results of proofreading.

[2] Configuration of Control Portion

Next, the functional portions included in the control portion 6 are described in detail with reference to FIG. 1 to FIG. 5. It is noted that although drawings, such as FIG. 2, showing specific examples of the image data Im1 and the fusion image Im10 include one-dot chain lines to indicate sections, leadout lines, and reference signs, they are used for the sake of explanation and are not really included in the image data Im1 and the fusion image Im10.

As shown in FIG. 1, the control portion 6 includes the first extraction portion 61, a second extraction portion 62, the fusion portion 63, a position acquiring portion 64, and a setting portion 65. That is, the image processing apparatus 10 includes, in addition to the first extraction portion 61 and the fusion portion 63, the second extraction portion 62, the position acquiring portion 64, and the setting portion 65 as the functions of the control portion 6.

The first extraction portion 61 extracts first objects Ob1 including handwritten objects from a plurality of pieces of image data Im1 that respectively correspond to a plurality of images read by the image reading portion 2 from a plurality of document sheets. Here, it is assumed that the plurality of pieces of image data Im1 respectively include individual first objects Ob1. As a result, the first extraction portion 61 extracts the first objects Ob1 individually from the plurality of pieces of image data Im1, and extracts a plurality of first objects Ob1 from the plurality of pieces of image data Im1 as a whole. Specifically, as shown in FIG. 2, in a case where there are a plurality of pieces of (in this example, two) image data Im11 and Im12, the first extraction portion 61 extracts a first object Ob11 from the image data Im11, and a first object Ob11 from the image data Im12.

The second extraction portion 62 extracts the second object Ob2 including a non-handwritten object from a plurality of pieces of image data Im1 that respectively correspond to a plurality of images read by the image reading portion 2 from a plurality of document sheets. Here, it is assumed that the plurality of pieces of image data Im1 include a same second object Ob2. As a result, the second extraction portion 62 extracts a same second object Ob2 from the plurality of pieces of image data Im1, and extracts one second object Ob2 from the plurality of pieces of image data Im1 as a whole. Specifically, as shown in FIG. 2, in a case where there are a plurality of pieces of (in this example, two) image data Im11 and Im12, the second extraction portion 62 extracts one second object Ob2 from the plurality of pieces of image data Im11 and Im12.

The "handwritten object" mentioned in the present disclosure refers to an object that is generated by human handwriting in general. That is, the "handwritten object" means an object written by a human on an image formation target such as a sheet with use of a writing tool such as a pen or a pencil without using a means such as printing, a word processor, or a computer, and the "handwritten object" includes a character, a numeral, a line, a symbol, a figure, and a picture. The "line" mentioned here includes various types of lines such as a strikeout, a leadout line, a dotted line, a one-dot chain line, and an underline. In addition, the "symbol" mentioned here includes, for example, a circle, a check mark, a check point, and the "figure" mentioned here includes, for example, a balloon, and a painting-out. In addition, the "handwritten object" is not limited to an object written by a human using a writing tool, but may be an object written by a human using, for example, a touch panel display. Furthermore, although it is expressed as "handwritten", the "handwritten object" is not limited to an object written by a human using his/her "hand", but may be an object written by a human using a part of his/her body, such as a mouth or a foot, other than the hand. In addition, the "handwritten object" includes a copy of a handwritten object, and an object, such as a woodcut print, generated by transferring ink using a human-made block.

On the other hand, the "non-handwritten object" mentioned in the present disclosure refers to an object that is generated by means other than human handwriting in general. That is, the "non-handwritten object" refers to an object formed on an image formation target such as a sheet with use of, for example, printing, a word processor, or a computer, and the "non-handwritten object" includes a character, a numeral, a line, a symbol, a figure, a picture, and a photograph. Accordingly, the "non-handwritten object" includes an object of a predetermined shape such as a "print letter" that is a character for printing.

In addition, the first object Ob1 extracted by the first extraction portion 61 only needs to include a handwritten object, but may include another type of object (such as a non-handwritten object). In other words, at least a part of handwritten objects included in the image data Im1 is the first object Ob1. In the present embodiment, as one example, all handwritten objects included in the image data Im1 are included in the first objects Ob1.

Similarly, the second object Ob2 extracted by the second extraction portion 62 only needs to include a non-handwritten object, but may include another type of object (such as a handwritten object). In other words, at least a part of non-handwritten objects included in the image data Im1 is the second object Ob2. In the present embodiment, as one example, all non-handwritten objects included in the image data Im1 are included in the second object Ob2.

Each piece of image data Im1 only needs to include the first object Ob1 and the second object Ob2, but may include an object of a type other than the first object Ob1 and the second object Ob2. In the present embodiment, as one example, each piece of image data Im1 includes only the first object Ob1 and the second object Ob2. Accordingly, in the present embodiment, objects included in the image data Im1 are classified either to the first object Ob1 that is a handwritten object, or to the second object Ob2 that is a non-handwritten object.

Compared to the non-handwritten object, the handwritten object has a tendency that a variation may occur in the feature amount of at least one of, for example, line direction, shape, size, balance, and density. In addition, even in a case where all handwritten objects are written by a same person, it is difficult that the handwritten objects are reproduced without a variation with regard to the feature amount of all of line direction, shape, size, balance, and density, and a variation may occur in the feature amount of at least one feature. In addition, the non-handwritten objects may include an object, such as a print letter, that is registered in advance. Furthermore, there is a difference with regard to the feature amount of, for example, a line distortion or a color or type of ink, between the handwritten objects and the non-handwritten objects. As a result, focusing on the feature amount of such features allows the "handwritten objects" included in the first objects Ob1 to be distinguished from the "non-handwritten objects" included in the second objects Ob2.

Accordingly, in the present embodiment, the first extraction portion 61 and the second extraction portion 62 classify each object included in the image data Im1 either to the first object Ob1 or to the second object Ob2. This makes it possible for the first extraction portion 61 to extract the first objects Ob1 from the image data Im1. Similarly, the second extraction portion 62 can extract the second objects Ob2 from the image data Im1.

Furthermore, in the present embodiment, the first extraction portion 61 and the second extraction portion 62 classify each of a plurality of (multiple) pixels constituting the image data Im1, either to the first object Ob1 or to the second object Ob2. This makes it possible for the first extraction portion 61 to, when extracting the first objects Ob1 from the image data Im1, extract position data representing positions (pixel positions) of the first objects Ob1 in the image data Im1, together with the first objects Ob1. Similarly, the second extraction portion 62 is configured to, when extracting the second objects Ob2 from the image data Im1, extract position data representing positions (pixel positions) of the second objects Ob2 in the image data Im1, together with the second objects Ob2. As one example, the first extraction portion 61 and the second extraction portion 62 classify each pixel constituting the image data Im1 either to the first object Ob1 or to the second object Ob2 by using the semantic segmentation that is an algorithm for Deep Learning for associating all pixels in the image data Im1 with labels or the like. More specifically, the first extraction portion 61 and the second extraction portion 62 perform classification (extraction) of the first object Ob1 and the second object Ob2 by using a learned network such as FCN (fully convolution network) or U-Net.

In addition, the second extraction portion 62 may compare a plurality of second objects Ob2 extracted from a plurality of pieces of image data Im1 with each other to extract only a second object Ob2 that is common to the plurality of pieces of image data Im1. Specifically, as shown in FIG. 2, in a case where there are a plurality of pieces of (in this example, two) image data Im11 and Im12, the second extraction portion 62 compares the second object Ob2 extracted from the image data Im11 with the second object Ob2 extracted from the image data Im12. Subsequently, the second extraction portion 62 extracts a second object Ob2 that is common to the plurality of pieces of image data Im1 based on the match ratio, or match/mismatch of a mark such as the page number, between a plurality of pieces of (in this example, two) second objects Ob2 that are comparison targets. With this configuration, for example, in a case where a plurality of pieces of image data Im1 include a plurality of objects that are non-handwritten objects and are not common to each other, it is possible to extract only a second object Ob2 that is common to the plurality of pieces of image data Im1.

As a result, as shown in FIG. 2, two first objects Ob11 and Ob12 and one second object Ob2 are extracted from two pieces of image data Im11 and Im12. In other words, the two pieces of image data Im11 and Im12 are classified to two first objects Ob11 and Ob12 and one second object Ob2. In FIG. 2, the left side shows the image data Im11 and Im12 and the right side shows the first objects Ob11 and Ob12 and the second object Ob2. In the example shown in FIG. 2, the first object Ob11 included in the image data Im11 is a handwritten object that suggests replacing "0" with "4" in a sequence of characters (print letters) "ABC1230" at the top of the second object Ob2. On the other hand, the first object Ob12 included in the image data Im12 is a handwritten object that suggests adding (inserting) "A" between "B" and "C" in a sequence of characters "ABC1230" at the top of the second object Ob2.

The position acquiring portion 64 acquires, for each piece of image data Im1, position information that indicates relative positions of the first objects Ob1 to the second object Ob2. That is, in each piece of image data Im1, the relative positions of the first objects Ob1 to the second object Ob2 are determined. The position acquiring portion 64 acquires the position information of the relative positions. In the present embodiment, the position acquiring portion 64 acquires the position information indicating the relative positions from the position data of the first objects Ob1 extracted by the first extraction portion 61, and the position data of the second object Ob2 extracted by the second extraction portion 62.

The fusion portion 63 generates the fusion image Im10 by fusing the plurality of first objects Ob1 extracted by the first extraction portion 61 and the second object Ob2 extracted by the second extraction portion 62. The "fusion" mentioned here means merging a plurality of pieces of data into one, and has an equivalent meaning as "coalescence" and "integration". As a result, the fusion portion 63 may perform the "fusion" in various styles such as superposition, "annotation", and link. For example, in a case where the plurality of first objects Ob1 are provided as "annotation" to the second object Ob2, the plurality of first objects Ob1 may be arranged around the second object Ob2, or the plurality of first objects Ob1 may be associated with specific points in the second object Ob2 by leadout lines or balloons. Furthermore, the fusion portion 63 may be configured to change the color, density or the like of at least one of the first objects Ob1 and the second object Ob2 in the fusion image Im10.

As described above, in the present embodiment, the second object Ob2 that is used to generate the fusion image Im10 is extracted from a plurality of pieces of image data Im1 by the second extraction portion 62. That is, the second object Ob2 used in the fusion image Im10 is extracted from at least one of a plurality of pieces of image data Im1. This allows the second object Ob2 used in the fusion image Im10 to be obtained without preparing image data other than the plurality of pieces of image data Im1. However, the image processing apparatus 10 is not necessarily required to extract, from the image data Im1, the second object Ob2 that is used in the fusion image Im10. For example, in a case where image data (clean data) that includes only the second object Ob2 is prepared independently of the plurality of pieces of image data Im1, the second object Ob2 in the clean data may be used to generate the fusion image Im10. In this case, the second extraction portion 62 that extracts the second object Ob2 from the image data Im1 can be omitted as necessary.

In addition, in the present embodiment, the fusion portion 63 generates the fusion image Im10 by superimposing the plurality of first objects Ob1 on the second object Ob2. That is, in the present embodiment, the fusion of the plurality of first objects Ob1 into the second object Ob2 is realized by the superimposition. This makes it possible to generate the fusion image Im10 of the same size as the image data Im1 without, for example, reducing the second object Ob2.

Furthermore, in the present embodiment, the fusion portion 63 determines the relative positions of the first objects Ob1 to the second object Ob2 in the fusion image Im10 based on the position information. That is, the position acquiring portion 64 acquires, for each piece of image data Im1, the position information that indicates the relative positions of the first objects Ob1 to the second object Ob2, and the positions of the first objects Ob1 in the fusion image Im10 are determined based on the position information. Basically, the fusion portion 63 determines the positions of the first objects Ob1 in the fusion image Im10 based on the position information in such a way as to reproduce the relative positions of the first objects Ob1 to the second object Ob2 in the image data Im1 from which the first objects Ob1 have been extracted. This makes it possible to obtain the fusion image Im10 in which are maintained the relative positions of the first objects Ob1 to the second object Ob2 in the image data Im1 from which the first objects Ob1 have been extracted, even in a case where the relative positions have meaning.

Specifically, in the example shown in FIG. 2, the fusion portion 63 fuses the two first objects Ob11 and Ob12 extracted from the two pieces of image data Im11 and Im12, into the second object Ob2 that is common to the two pieces of image data Im11 and Im12. This produces the fusion image Im10 shown in FIG. 3 in which the two first objects Ob11 and Ob12 are superimposed on one second object Ob2. In addition, in the fusion image Im10, the relative position of the first object Ob11 extracted from the image data Im11 to the second object Ob2 maintains the relative position in the image data Im11. Similarly, in the fusion image Im10, the relative position of the first object Ob12 extracted from the image data Im12 to the second object Ob2 maintains the relative position in the image data Im11.

Figure 3:
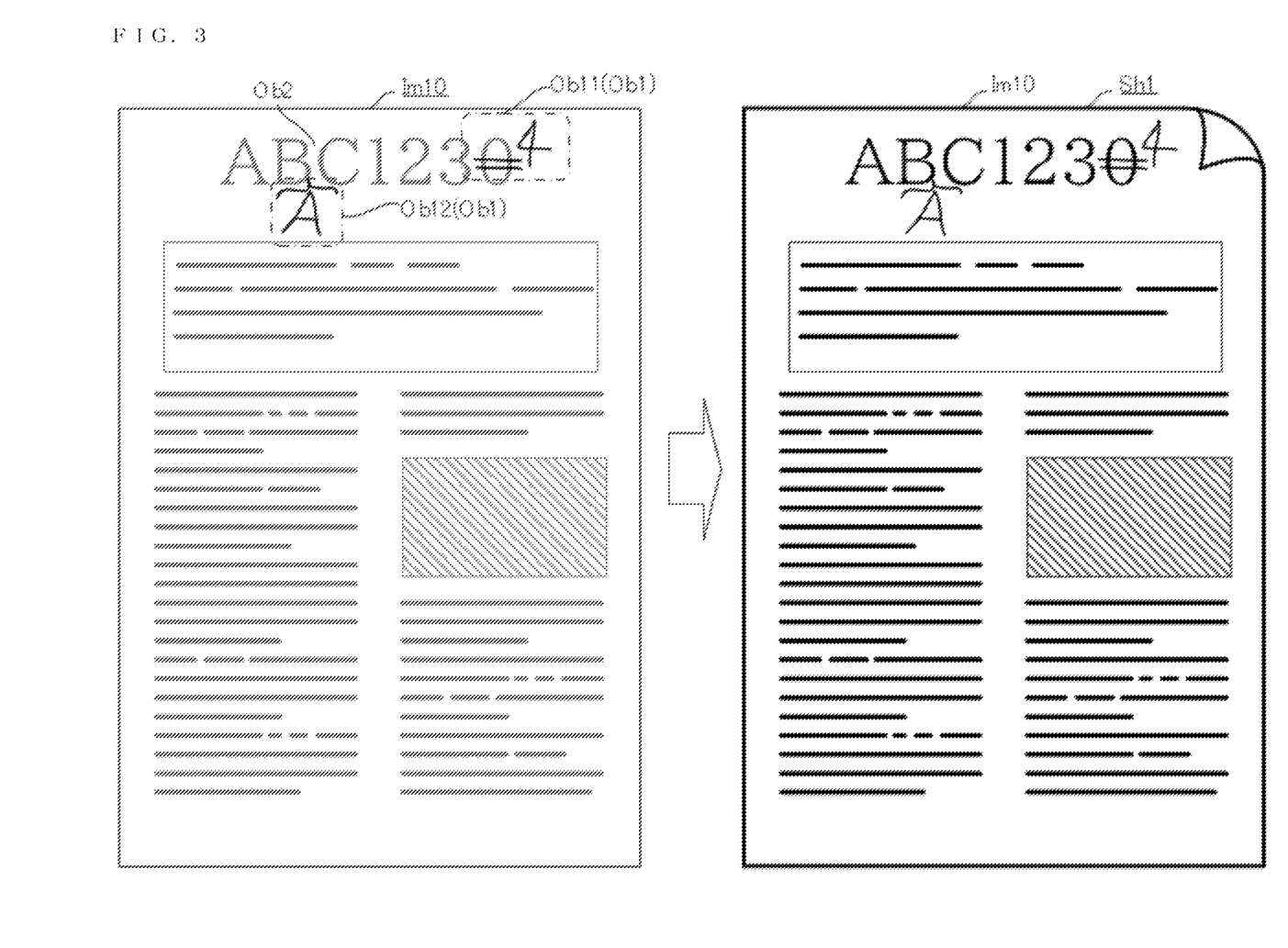
FIG. 3 is a schematic diagram showing an example of a fusion image generated by the image processing apparatus according to the embodiment.

In addition, in the present embodiment, the fusion portion 63 outputs, to the image forming portion 3, print data including the generated fusion image Im10. The image forming portion 3 forms the fusion image Im10 on a sheet Sh1 (see FIG. 3) based on the print data including the fusion image Im10, the sheet Sh1 being a target of image formation supplied from the sheet supply portion 4. In the present embodiment, the sheet Sh1 that is a target of image formation is, for example, paper. However, not limited the paper, the sheet Sh1 may be, for example, resin film. That is, the fusion portion 63 outputs, to the image forming portion 3, print data used to form the fusion image Im10, and, as shown in FIG. 3, the image forming portion 3 forms the fusion image Im10 on the sheet Sh1. In this way, the image processing apparatus 10 according to the present embodiment includes the image forming portion 3 configured to form the fusion image Im10 on the sheet Sh1. With this configuration, it is possible to obtain, on the sheet Sh1, the fusion image Im10 in which the plurality of first objects Ob1 extracted from the plurality of pieces of image data Im1 are fused into the second object Ob2 that is common to the plurality of pieces of image data Im1. In FIG. 3, the left side shows the fusion image Im10 as data, and the right side shows the sheet Sh1 with the fusion image Im10 formed thereon.

As described above, the image processing apparatus 10 according to the present embodiment is configured to form a copy of one fusion image Im10 in which a plurality of pieces of image data Im1 read from a plurality of document sheets by the image reading portion 2 are merged. This makes it possible to integrate information (the first objects Ob1 and the second object Ob2) written on a plurality of document sheets into one sheet Sh1, and provide a view of the information on one sheet Sh1. It is noted that the form of the output of the fusion image Im10 generated by the fusion portion 63 is not limited to the formation on the sheet Sh1 by the image forming portion 3, but the fusion image Im10 may be, for example, displayed on a display portion, transmitted to an external apparatus, or written to a non-transitory recording medium that can be read by a computer system.

The fusion portion 63 basically determines the positions of the first objects Ob1 in the fusion image Im10 based on the position information. Accordingly, there may be a case where two or more first objects Ob1 overlap with each other. That is, in a case where positions of the first objects Ob1 overlap with each other in two or more pieces of image data Im1, two or more first objects Ob1 extracted from the two or more pieces of image data Im1 may overlap with each other in the fusion image Im10. In the present embodiment, to prevent two or more first objects Ob1 from overlapping with each other in the above-described case, the fusion portion 63 has a function to adjust the positions of the first objects Ob1 in the fusion image Im10. Furthermore, in the present embodiment, in addition to the positional adjustment function, the fusion portion 63 has a function to adjust (for example, reduce) the size of the first objects Ob1 in the fusion image Im10.

Specifically, it is assumed here that, in addition to the above-described two pieces of image data Im11 and Im12 (see FIG. 2), a first object Ob1 extracted from another piece of image data Im13 (see FIG. 4) is fused into the fusion image Im10. In this case, as shown in FIG. 4, the image data Im13 (the right side of FIG. 4) needs to be fused into the fusion image Im10 (the left side of FIG. 4) in which the two pieces of image data Im11 and Im12 have already been fused. Here, the first object Ob12 extracted from the image data Im12 (see FIG. 2) and the first object Ob13 extracted from the image data Im13 overlap with each other in the relative positions to the second object Ob2. In the example shown in FIG. 4, the first object Ob13 included in the image data Im13 is a handwritten object that suggests adding (inserting) "10 MHz" in a sequence of characters (print letters) included in the second object Ob2.

Figure 5:
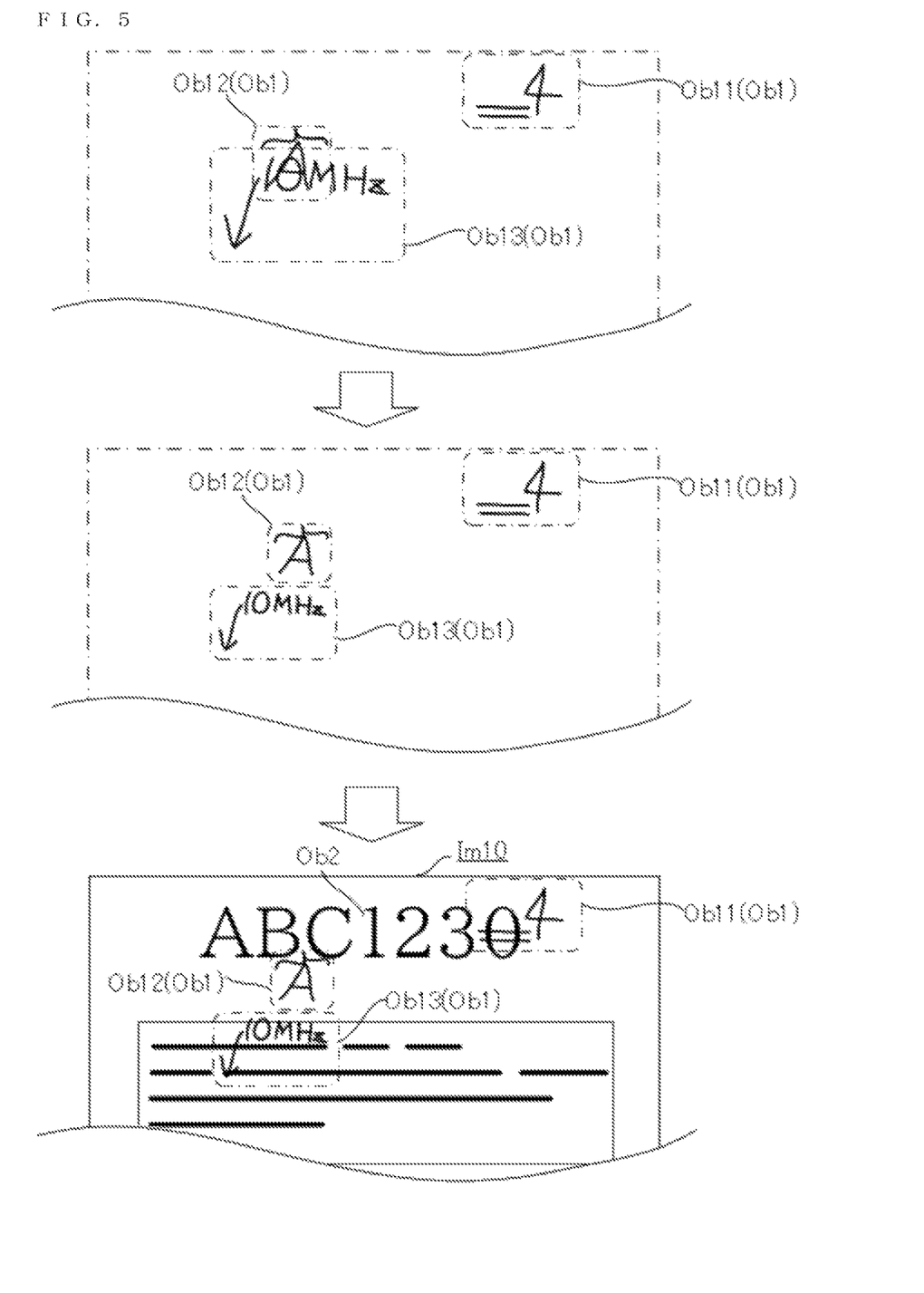
FIG. 5 is a schematic diagram showing how the positions of the first objects are adjusted by the image processing apparatus according to the embodiment.

In this case, as shown in the upper portion of FIG. 5, if the original positions of the two first objects Ob12 and Ob13 in the image data Im1 are maintained in the fusion image, the two first objects Ob12 and Ob13 overlap with each other. As a result, as shown in the middle portion of FIG. 5, the fusion portion 63 adjusts the positions of the two first objects Ob12 and Ob13. In the example shown in FIG. 5, the fusion portion 63 first reduces each of the two first objects Ob12 and Ob13 in size, and then adjusts the positions by shifting the first object Ob12 upward and the first object Ob13 downward. Subsequently, the fusion portion 63 generates the fusion image Im10 in which a plurality of first objects Ob1 are superimposed on the second object Ob2, by superimposing the plurality of (in this example, three) first objects Ob11, Ob12, and Ob13 onto the second object Ob2. As shown in the lower portion of FIG. 5, the two first objects Ob12 and Ob13 avoid from overlapping with each other in the fusion image Im10 thus generated.

As described above, in a case where the position information indicates that the first objects Ob1 in two pieces of image data Im1 among a plurality of pieces of image data Im1 overlap with each other, the fusion portion 63 adjusts the positions, in the fusion image Im10, of the first objects Ob1 extracted from at least one of the two pieces of image data Im1. This facilitates avoiding a plurality of first objects Ob1 from overlapping with each other in the fusion image Im10.

The setting portion 65 is configured to set valid/invalid of the fusion portion 63. When the fusion portion 63 has been set to be invalid, the above-described generation of the fusion image Im10 is not performed. In addition, the setting portion 65 may be configured to set valid/invalid for each function of the fusion portion 63, such as the above-described positional adjustment of the first objects Ob1 in the fusion image Im10. The valid/invalid of the fusion portion 63 is selected by an operation of the user. Specifically, the user selects an operation mode on a setting screen, and the setting portion 65 sets valid/invalid of the fusion portion 63 in accordance with a selected operation mode. This makes it possible for each of the users to select valid/invalid of the fusion portion 63.

[3] Image Processing Method

Figure 6:
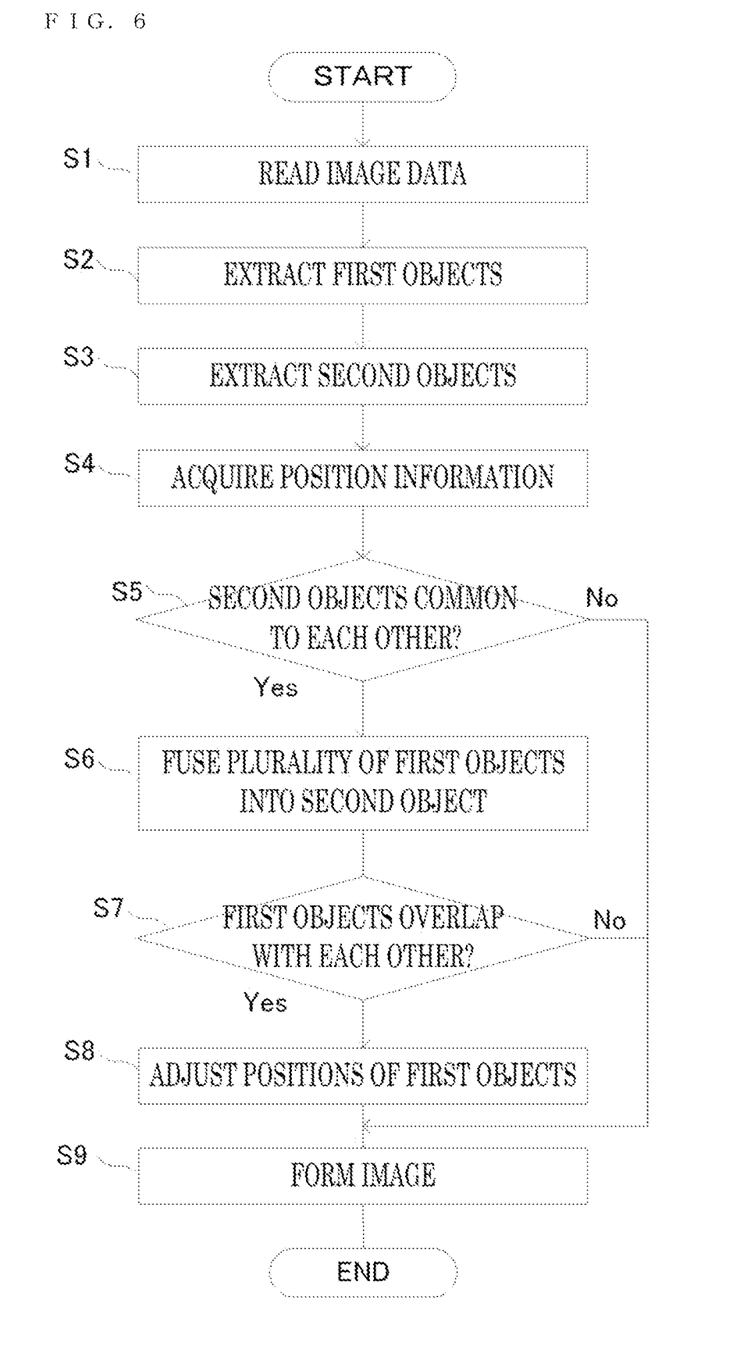
FIG. 6 is a flowchart showing an example of an image processing method executed by the image processing apparatus according to the embodiment.

In the following, with reference to FIG. 6, a description is given of an example of the procedure of an image processing method executed in the image processing apparatus 10. Here, steps S1, S2, . . . in the flowchart shown in FIG. 6 represent numbers assigned to the processing procedures (steps) executed by the control portion 6.

The image processing method according to the present embodiment is executed by the control portion 6. In other words, the image processing method is executed by the control portion 6 that comprises, as a main configuration, a computer system. As a result, the program according to the present embodiment is a program that causes one or more processors (in the control portion 6) to execute the image processing method.

<Step S1>

First, in step S1, the control portion 6 causes the image reading portion 2 to read images from a plurality of document sheets, and obtains a plurality of pieces of image data Im1 that respectively correspond to the read images. That is, in step S1, the plurality of pieces of image data Im1 are input from the image reading portion 2 to the control portion 6.

<Step S2>

Next, in step S2, the control portion 6 causes the first extraction portion 61 to extract the first objects Ob1 including handwritten objects, from a plurality of pieces of image data Im1 (an extraction process). That is, in step S2, the first objects Ob1 are extracted from the plurality of pieces of image data Im1 that include the first objects Ob1 including the handwritten objects and the second objects Ob2 including non-handwritten objects. Here, the control portion 6 causes the first extraction portion 61 to extract the first objects Ob1 by causing the first extraction portion 61 to determine, for each pixel of the image data Im1, whether or not the pixel is classified as the first object Ob1.

<Step S3>

In step S3, the control portion 6 causes the second extraction portion 62 to extract the second objects Ob2 including the non-handwritten objects, from the plurality of pieces of image data Im1. That is, in step S3, the second objects Ob2 are extracted from the plurality of pieces of image data Im1 that include the first objects Ob1 including the handwritten objects, and the second objects Ob2 including the non-handwritten objects. Here, the control portion 6 causes the second extraction portion 62 to extract the second objects Ob2 by causing the second extraction portion 62 to determine, for each pixel of the image data Im1, whether or not the pixel is classified as the second object Ob2.

<Step S4>

In step S4, the control portion 6 causes the position acquiring portion 64 to acquire, for each piece of image data Im1, position information that indicates relative positions of the first objects Ob1 to the second objects Ob2. That is, in step S4, the control portion 6 acquires the position information indicating the relative positions from the position data of the first objects Ob1 extracted by the first extraction portion 61, and the position data of the second objects Ob2 extracted by the second extraction portion 62.

<Step S5>

In step S5, the control portion 6 determines whether or not the second objects Ob2 extracted from the plurality of pieces of image data Im1 are common to each other. That is, in step S5, the control portion 6 causes the second extraction portion 62 to compare the second objects Ob2 extracted from the plurality of pieces of image data Im1 with each other, and extract only the second object Ob2 that is common to the plurality of pieces of image data Im1.

Upon determining that the compared second objects Ob2 are common to each other based on the match ratio or the like (S5:Yes), the control portion 6 moves the process to step S6. Upon determining that the compared second objects Ob2 are not common to each other based on the match ratio or the like (S5:No), the control portion 6 moves the process to step S9.

<Step S6>

In step S6, the control portion 6 causes the fusion portion 63 to generate a fusion image Im10 by fusing a plurality of first objects Ob1 extracted by the first extraction portion 61 and a second object Ob2 extracted by the second extraction portion 62 (a fusion process). That is, in step S6, the control portion 6 generates the fusion image Im10 by fusing a plurality of first objects Ob1 extracted from a plurality of pieces of image data Im1 into the second object Ob2 that is common to the plurality of pieces of image data Im1.

At this time, the fusion portion 63 determines the relative positions of the plurality of first objects Ob1 with respect to the second object Ob2 in the fusion image Im10, based on the position information acquired in step S4. After this, the fusion portion 63 generates the fusion image Im10 by superimposing the plurality of first objects Ob1 onto the second object Ob2.

<Step S7>

In step S7, the control portion 6 determines whether or not two or more first objects Ob1 overlap with each other in the fusion image Im10. That is, in step S7, the control portion 6 determines whether or not there are two or more pieces of position information that overlap with each other, among a plurality of pieces of position information of a plurality of first objects Ob1 fused by the fusion portion 63 to detect whether or not two or more first objects Ob1 overlap with each other in the fusion image Im10.

Upon determining that the first objects Ob1 overlap with each other (S7: Yes), the control portion 6 moves the process to step S8. Upon determining that there is no overlapping of first objects Ob1 (S7: No), the control portion 6 moves the process to step S9.

<Step S8>

In step S8, the control portion 6 causes the fusion portion 63 to adjust the positions of the first objects Ob1 in the fusion image Im10. That is, in step S8, the fusion portion 63 adjusts the positions (and sizes) of the first objects Ob1 in the fusion image Im10 to avoid overlapping of the two or more first objects Ob1.

<Step S9>

In step S9, the control portion 6 causes the image forming portion 3 to form an image on the sheet Sh1. Here, in a case where it was determined as "Yes" in step S5, the fusion image Im10 has been generated, and the control portion 6 causes the fusion portion 63 to output print data including the fusion image Im10 to the image forming portion 3 so that the fusion image Im10 is formed on the sheet Sh1. On the other hand, in a case where it was determined as "No" in step S5, the control portion 6 outputs print data including the image data Im1 itself to the image forming portion 3 so that an image according to the image data Im1 is formed on the sheet Sh1.

The above-described procedure of the display control method is only an example, and the processing order of the flowchart shown in FIG. 6 may be changed as necessary.

[4] Modification

A plurality of components of the image processing apparatus 10 may be provided dispersedly in a plurality of housings. For example, all of the first extraction portion 61, the second extraction portion 62, and the fusion portion 63 may not necessarily be realized as the functions of the control portion 6, and at least one of the first extraction portion 61, the second extraction portion 62, and the fusion portion 63 may be provided in a housing that is different from a housing of the control portion 6.

In addition, the use of the image processing apparatus 10 is not limited to the unified management of proofread document sheets. For example, the image processing apparatus 10 according to the present embodiment may be used for a unified management of signature forms where a plurality of persons jointly sign a single document, or a unified management of things on which messages have been handwritten by a plurality of persons. In documents of signature forms or the like, the first objects Ob1 including handwritten objects (signatures) may be required to have high security. Accordingly, in a case where the first objects Ob1 are extracted from the image data Im1 of this type of document, the image processing apparatus 10 may notify the user that the document is of high security, automatically encrypt the data, or partially change the data into a mosaic.

In addition, the image processing apparatus 10 does not necessarily include the image forming portion 3 that is configured to form the fusion image Im10 on the sheet Sh1, but may output the fusion image Im10 to outside as data (image data). In this case, the image processing apparatus 10 only needs to have a function to read image data as the image processing function, and may be, for example, a scanner.

In addition, the "plurality of pieces of image data Im1" from which the first objects Ob1 are extracted in the image processing apparatus 10 are not limited to the image data Im1 output from the image reading portion 2, but may be the image data Im1 input from an information processing apparatus or the like external to the image processing apparatus 10. In this case, the image processing apparatus 10 only needs to have a function to form an image as the image processing function, and may be, for example, a printer.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
    an extraction portion configured to extract a first object from each of a plurality of pieces of image data that include the first object and a second object, the first object including a handwritten object, the second object including a non-handwritten object;
    a fusion portion configured to generate a fusion image by fusing a plurality of first objects extracted from the plurality of pieces of image data into the second object that is common to the plurality of pieces of image data; and
    a position acquiring portion configured to acquire, for each of the plurality of pieces of image data, position information that indicates a relative position of the first object to the second object, wherein
    the fusion portion generates the fusion image in which the plurality of first objects are superimposed on the second object, by superimposing the plurality of first objects onto the second object,
    the fusion portion determines relative positions of the plurality of first objects to the second object in the fusion image based on the position information, and
    in a case where the position information indicates that first objects in two pieces of image data among the plurality of pieces of image data overlap with each other, the fusion portion adjusts a position, in the fusion image, of a first object extracted from at least one of the two pieces of image data to avoid the overlapping of the first objects.

2. The image processing apparatus according to claim 1, wherein
    the second object in the fusion image is extracted from at least one of the plurality of pieces of image data.

3. The image processing apparatus according to claim 1, further comprising:

an image forming portion configured to form the fusion image on a sheet.

4. The image processing apparatus according to claim 1, wherein, in a case where the position information indicates that the first objects in the two pieces of image data among the plurality of pieces of image data overlap with each other, the fusion portion adjusts a size of the first object in the fusion image to avoid the overlapping of the first objects.

5. An image processing method comprising:

an extraction process to extract a first object from each of a plurality of pieces of image data that include the first object and a second object, the first object including a handwritten object, the second object including a non-handwritten object;

a fusion process to generate a fusion image by fusing a plurality of first objects extracted from the plurality of pieces of image data into the second object that is common to the plurality of pieces of image data; and a position acquiring process to acquire, for each of the plurality of pieces of image data, position information that indicates a relative position of the first object to the second object, wherein in the fusion process, the fusion image in which the plurality of first objects are superimposed on the second object is generated by superimposing the plurality of first objects onto the second object, in the fusion process, relative positions of the plurality of first objects to the second object in the fusion image are determined based on the position information, and in the fusion process, in a case where the position information indicates that the first objects in two pieces of image data among the plurality of pieces of image data overlap with each other, a position, in the fusion image, of a first object extracted from at least one of the two pieces of image data is adjusted to avoid the overlapping of the first objects.

* * * * *